United States Patent [19]
Fujisawa et al.

[11] Patent Number: 5,739,475
[45] Date of Patent: Apr. 14, 1998

[54] GROMMET FOR PROTECTING A WIRE HARNESS WITH STRUCTURE FOR ENSURING FLUSH SEATING

[75] Inventors: Atushi Fujisawa; Hiroo Fujita, both of Yokkaichi; Katsuhide Shiji; Keisuke Tokoro, both of Nagoya, all of Japan

[73] Assignees: Inoac Corporation, Nagoya; Sumitomo Wiring Systems, Ltd., Mie, both of Japan

[21] Appl. No.: 425,411

[22] Filed: Apr. 20, 1995

[30] Foreign Application Priority Data

Apr. 21, 1994 [JP] Japan .................. 6-107898
Mar. 9, 1995 [JP] Japan .................. 7-079436

[51] Int. Cl.⁶ .................. H01B 17/26; H02G 3/22
[52] U.S. Cl. .................. 174/153 G; 248/56; 277/178
[58] Field of Search .................. 174/65 G, 151, 174/152 G, 152 R, 153 G; 16/2; 248/56; 277/178

[56] References Cited

FOREIGN PATENT DOCUMENTS

| | | |
|---|---|---|
| 0214210 | 3/1961 | Austria .................. 174/153 G |
| 0580130 | 1/1994 | European Pat. Off. .................. 174/153 G |
| 2547452 | 12/1984 | France .................. 174/153 G |
| 61-279007 | 12/1986 | Japan . |
| 2-143587 | 12/1990 | Japan . |
| 4-249817 | 9/1992 | Japan .................. 174/167 |
| 5-94726 | 4/1993 | Japan . |
| 262532 | 12/1926 | United Kingdom . |

*Primary Examiner*—Hyung S. Sough
*Attorney, Agent, or Firm*—Oliff & Berridge, PLC

[57] ABSTRACT

A grommet which is used to protect a wire harness in a through portion formed in a vehicle body and the like. The grommet includes a base portion formed of rubber and having a mounting groove fittable with an opening edge of a mating member, a roof portion extending inwardly from the opening end of the base portion, and a guide portion extending in a cylindrical shape in the axial direction of the grommet from the inner end of the roof portion. In the grommet, a ring-shaped cavity is formed in the inner wall portion of the grommet extending from the base portion to the roof portion, and an annular cavity is formed in the inner peripheral wall of the base portion corresponding to the position of the mounting groove.

11 Claims, 12 Drawing Sheets

GROMMET FOR PROTECTING A WIRE HARNESS WITH STRUCTURE FOR ENSURING FLUSH SEATING

BACKGROUND OF THE INVENTION

1. Field of the Invention

The present invention relates to a grommet which is used to protect a wire harness in a through portion formed in a vehicle body and the like.

2. Description of the Related Art

In the respective bodies of a dash panel, a cowl panel and the like of an automobile, there are formed openings through which a wire harness consisting of a plurality of electric wires tied up in a bundle can be passed.

Figure 21:
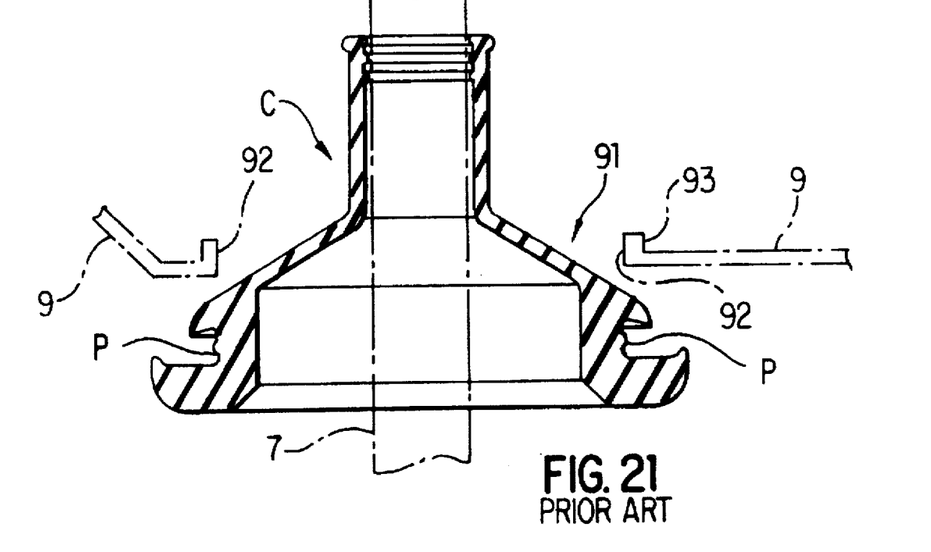
FIG. 21 is a longitudinal section view of a conventional grommet.

For example, in FIG. 21, when passing a wire harness 7 through an opening 91, conventionally, at first, a grommet C formed of a rubber ring is inserted over the wire harness 7 and, after then, these parts are pulled into the engine room side from the car room side to thereby mount the grommet C to the opening 91. This aims at protecting the wire harness 7 with the grommet C and also preventing water from leaking into the car room.

Figure 22:
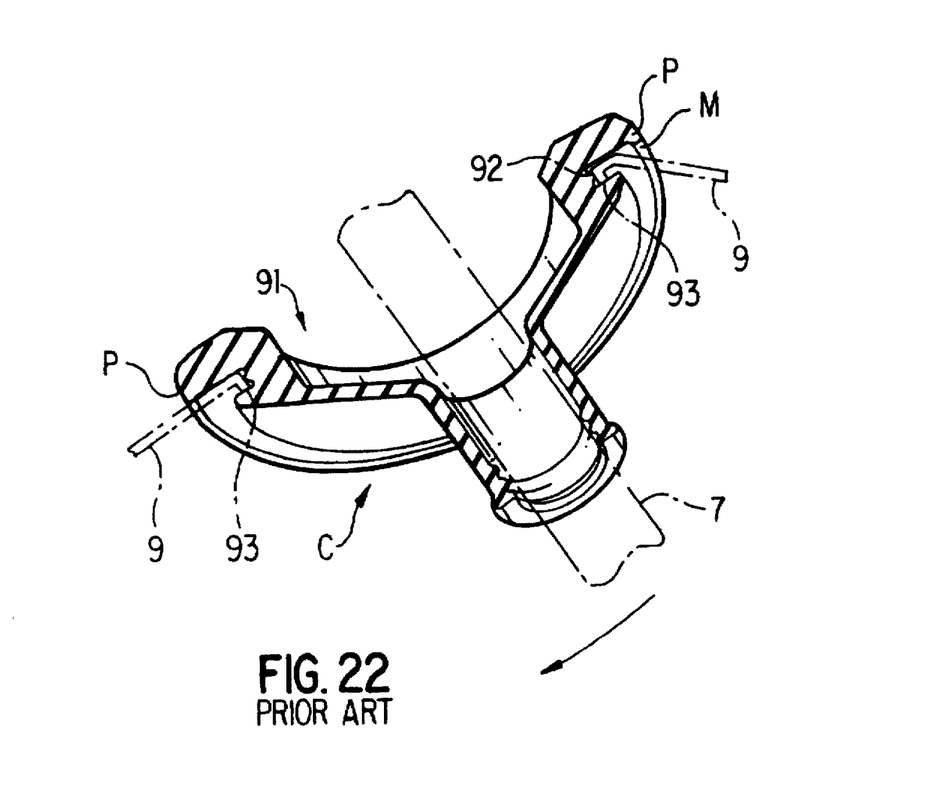
FIG. 22 is a longitudinal section view of the conventional grommet, showing a state thereof In which it is in fit with an open edge of a mating member.

FIG. 22 shows a state in which the grommet C is mounted to and fitted into an opening edge 92 of a mating member 9 and, in the case of the burring portion 93 which is formed to take a stand-up attitude perpendicular from the mating member 9, the grommet C is well fitted with the opening edge 92.

Figure 6:
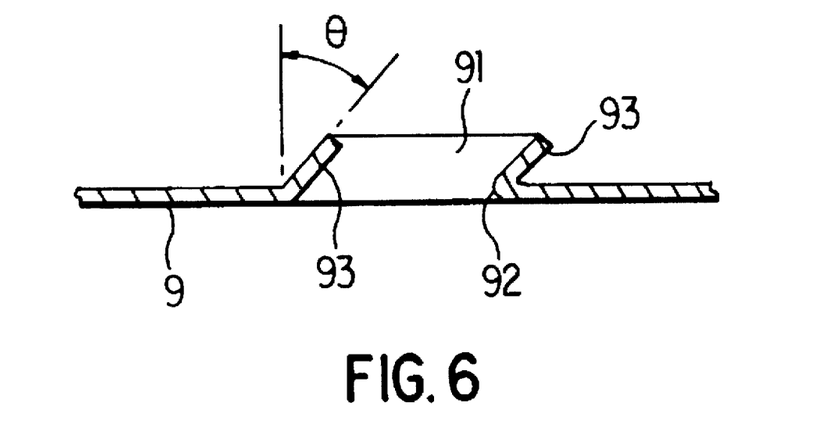
FIG. 6 is a section view of the mating member.
Figure 23:
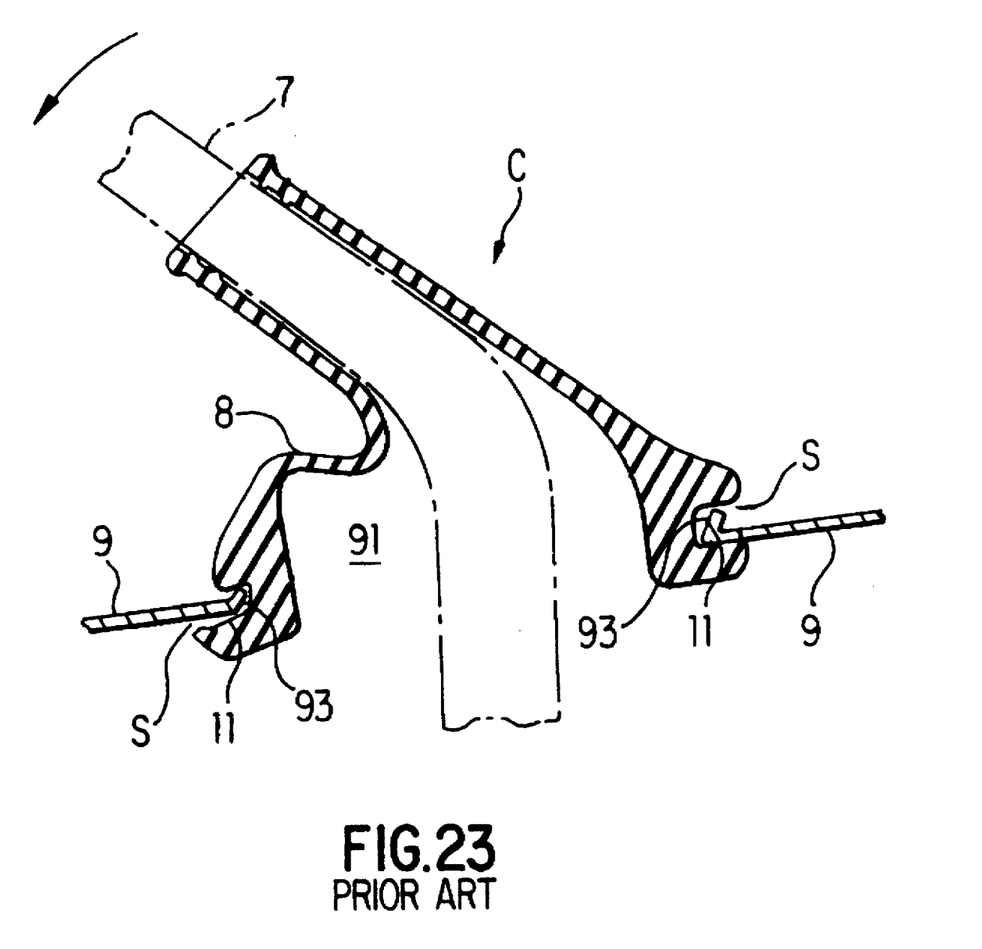
FIG. 23 is a longitudinal section view of the conventional grommet, showing a state thereof in which it is in fit with an open edge of a mating member.

In recent years, however, parts to be provided in an engine room and in a car room are increased in number and the cowl panel and the like are inclined in order to avoid these parts, while a direction in which the opening 91 is formed (that is, a drawing direction) remains the same as the conventional direction, which makes it difficult for the burring portion 93 to stand up perpendicularly to the panel. As a result of this, the burring portion 93 is inclined to project toward the engine room. The inclination angle θ of the burring portion 93 varies in a range of 0°–20° according to the types of cars (FIG. 6). Under such conditions, if the grommet C is mounted, then there is produced a clearance S in a mounting groove 11 which is fitted with the opening edge of the mating member, as shown in FIG. 23. The clearance S causes an inconvenience that water leaks into the car room.

Further, normally, the wire harness 7 is bent extremely from the neighborhood of the exit of the grommet C (as shown by arrows in FIGS. 22 and 23) and the clearance S is further increased by such bend, with the result that a water leakage occurs immediately. In addition, there is a tendency that a plane area in the periphery of the opening 91 with respect to the mating member 9 is reduced. For this reason, even if an annular projection P for sealing is provided in the outer periphery of the mounting groove 11, a clearance M can be easily produced between the grommet C and the mating member 9, to often make the grommet useless. (FIG. 22).

Also, in recent years, in order to prevent water from entering through a clearance between electric wires which form a wire harness, a filler is loaded into the grommet in some cases. If such a filler is loaded into the grommet, then the portion of the grommet holding the filler is stiffened and unbendable. For this reason, when trying to bend and place the wire harness, the above-mentioned clearances S and M are further increased in size.

SUMMARY OF THE INVENTION

The present invention aims at eliminating the problems found in the above-mentioned conventional grommet.

Accordingly, it is an object of the invention to provide a grommet which can be surely fitted with the opening edge of a mating member to perform a water prevention function even when a burring portion provided in the periphery of an opening is inclined or even when a wire harness is bent.

In attaining the above object, the invention provides a grommet including: a base portion having in an annular outer peripheral wall thereof a mounting groove fittable with an opening edge of a mating member; a roof portion extending inwardly from an opening end of the base portion; and a guide portion extending in a cylindrical shape in an axial direction of the grommet from an inner end of the roof portion, wherein a first annular cavity is formed in an inner wall of the grommet extending from the base portion to the roof portion, and a second cavity is formed in an inner peripheral wall of the base portion corresponding to a position of the mounting groove.

Further, the invention provides a grommet to be mounted to an opening formed in a mating member together with a wire harness including a plurality of bundled electric wires inserted therethrough, the grommet including: a base portion having in an annular outer peripheral wall thereof a mounting groove fittable with an opening edge of a mating member; a roof portion extending inwardly from an opening end of the base portion; a medium diameter portion formed in a cylindrical shape having an inside diameter larger than a diameter of the wire harness to be inserted and extended from the roof portion upwardly in an axial direction of the grommet; a small diameter portion reduced continuously in diameter from the opening end of the medium diameter portion and extended in a cylindrical shape upwardly in the axial direction of the grommet; and an annular cavity formed in an inner peripheral wall of the base portion corresponding to a position of the mounting groove.

DETAILED DESCRIPTION OF THE PREFERRED EMBODIMENTS

Now, description will be given below in detail of the invention by use of the embodiments thereof.

(1) Embodiment 1

Figure 1:
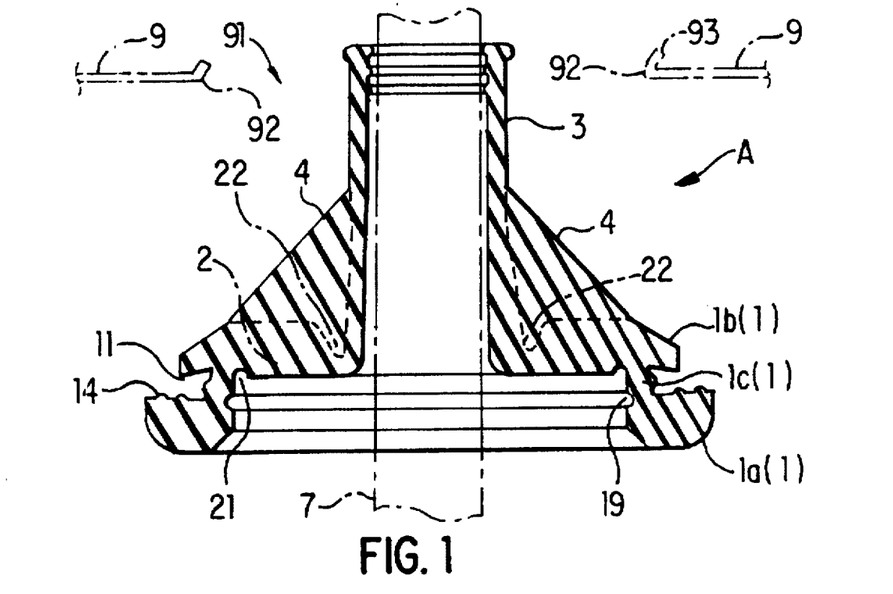
FIG. 1 is a longitudinal section view of a first embodiment of a grommet according to the invention.
Figure 2:
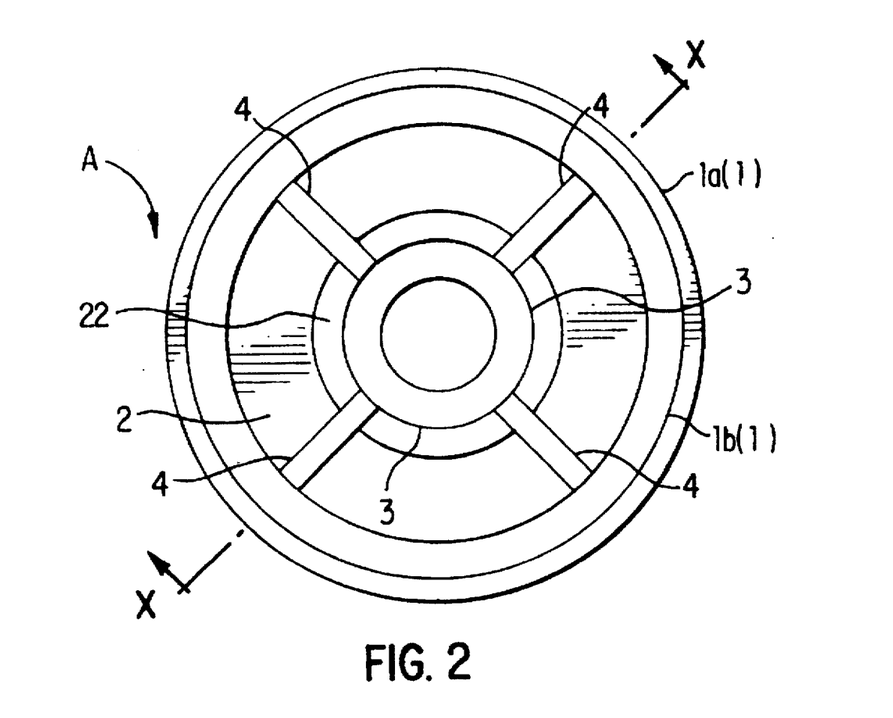
FIG. 2 is a plan view of the grommet shown in FIG. 1.
Figure 3:
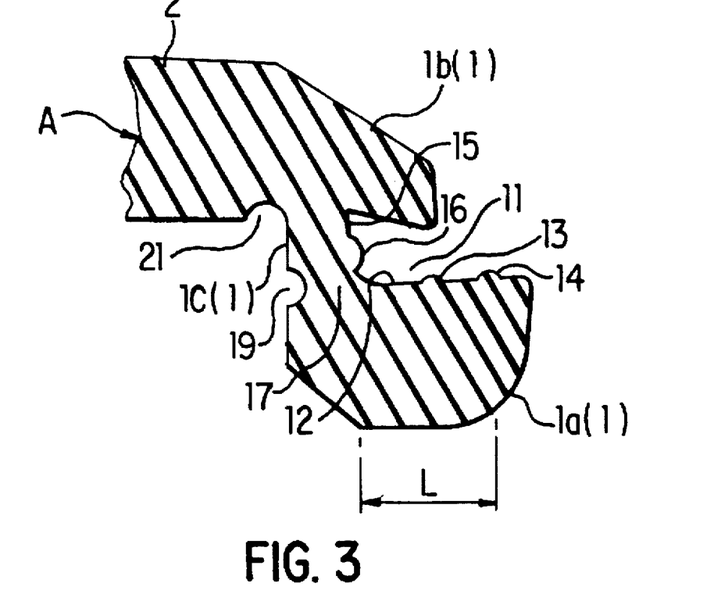
FIG. 3 is an enlarged view of the peripheral portions of a base portion of the grommet.
Figure 4:
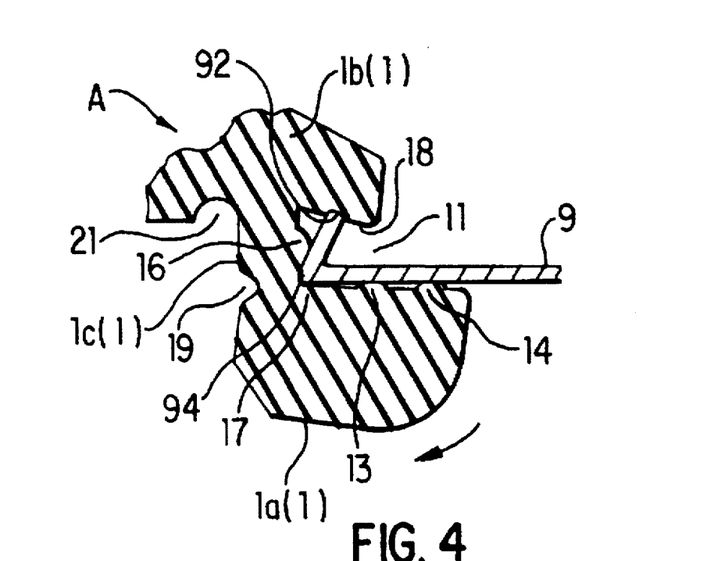
FIG. 4 is an enlarged view of the base portion of the grommet, showing a state in which the base portion is in fit with a mating member.
Figure 5:
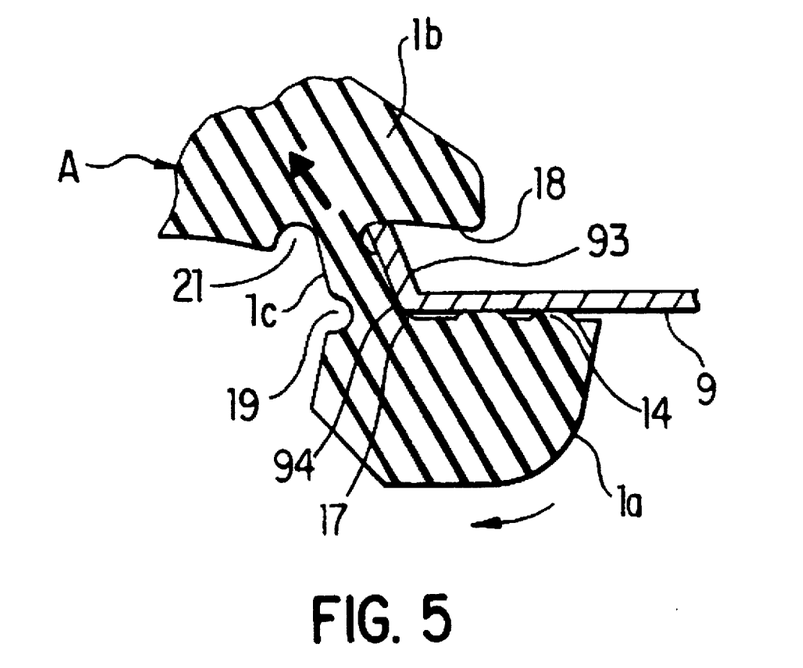
FIG. 5 is an enlarged view of the grommet base portion, showing a state in which the base portion is in fit with a mating member.

FIGS. 1 to 5 respectively show the first embodiment of a grommet according to the invention. In particular, FIG. 1 is a longitudinal section view of the grommet, FIG. 2 is a plan view thereof, FIG. 3 is an enlarged view of the peripheral portions of a base portion of the grommet, and FIGS. 4 and 5 are enlarged views of the grommet base portion, respectively showing the different states thereof in which the base portion is in fit with a mating member.

In these figures, reference character A designates a grommet which is made of ethylene propylene rubber (EPDM) by rubber molding. The grommet A includes a base portion 1, a roof portion 2, a guide portion 3, and stays 4. And, the grommet A is used as a protective member to protect the exterior of the wire harness 7 when the wire harness 7 is inserted through the opening 91 (see FIG. 23).

The base portion 1 consists of a thick annular body (having an outside diameter of about 70 mm, an inside diameter of about 50 mm, and a height of about 20 mm) which includes a ring-shaped mounting groove 11 in the outer peripheral wall thereof. In particular, if the mounting groove 11 of the base portion 1 is fitted with the opening edge 92 of the mating member 9 (in this case, a cowl panel), then the grommet A can be fixed to the mating member 9 (FIG. 4).

The mounting groove 11 is a recessed groove having a U-shaped section and, as shown in FIG. 3, is defined by a lower jaw portion 1a, an upper jaw portion 1b, and a connecting portion 1c which are respectively the components of the base portion 1. The reason why the respective portions are made thick is to perfectly fit and fix the grommet A to the mating member 9. Here, the upper jaw portion 1b includes on the upper surface thereof a surface which is inclined downwardly as it goes outwardly (see FIGS. 1 and 2). Also, in more particular, FIG. 1 is a longitudinal section view of the grommet A, taken along the arrow line X—X shown in FIG. 2.

The mounting groove 11 includes on a lower surface 12 thereof sealing annular portions 13 and 14 which are respectively raised up in a ring shape. The sealing annular portions 13 and 14 are respectively formed at positions inside the outside diameter of the base portion 1 and, if a plane securing length L is approx. 6 mm externally from the opening 91 (FIG. 3), then a stable sealing condition can be secured by means of the sealing annular portions 13 and 14. Also, the mounting groove 11 includes an annular projection 16 on a vertical surface 15 thereof.

When the grommet A is fitted with the mating member 9 and the inner end portion 94 of the opening edge 92 is abutted against a corner portion 17 where the lower surface 12 and vertical surface 15 of the mounting groove 11 cross each other, then the sealing annular portions 13, 14 and annular projection 16 are lapped approx. 0.5 mm with the opening 92, thereby allowing the grommet A to produce therein overlapping portions with the mating member 9. Due to presence of the overlapping portions, when the grommet A and mating member 9 are pressure contacted with each other by means of the elastic deformation of rubber, then a higher water preventive effect can be obtained. Since rubber is soft, it can be elastically deformed in a range of 0.5 mm or so and, therefore, the grommet A can be contacted closely with the mating member 9.

Further, an upper surface 18 of the mounting groove 11 is formed so as to draw a semiarc about the corner portion 17, and thus approaches the lower surface 12 as it goes outwardly (FIGS. 4 and 5). This structure is employed in order that, at whatever angles the burring portion 93 is inclined, the leading end thereof can be contacted with the upper surface 18 of the mounting groove 11, that is, water sealing can be achieved in every position of the upper surface 18. This structure is employed also in order that the outer end of the upper surface 18 can bite the portion of the mating member 9 in the periphery of the opening edge 92 to thereby be sure to fix the grommet A to the mating member 9.

On the other hand, in the inner peripheral wall of the base portion 1 corresponding to the position of the mounting groove 11, there is formed an annular cavity 19 (which is a semicircular cavity having a diameter of approx. 2 mm).

Here, as shown in FIG. 3, it is preferred that the annular cavity 19 is formed in a portion where the lower jaw portion 1a and the connecting portion 1c meet each other. Thanks to this, the lower jaw portion 1a is able to move independently in a direction shown by an arrow in FIG. 4 by means of the rubber elastic deformation, so that the lower jaw portion 1a can be easily contacted closely with the inclined burring portion 93.

The roof portion 2 which is formed to extend inwardly from the opening end of the upper jaw portion 1b of the base portion 1. The roof portion 2, similarly to the base portion 1, is formed thick (that is, it is of approx. 8 mm in thickness), and it includes a thick plate which covers the upper surface of the base portion 1 in order to reduce the aperture of the base portion 1 (FIG. 1).

In the inner wall portion that extends from the base portion 1 to the roof portion 2, there is formed a ring-shaped cavity 21 (which is a semicircular cavity having a diameter of approx. 2 mm). Due to the cavity 21, when the grommet A is bent, the grommet A can be easily bent at the cavity 21 portion to thereby prevent the deformation applied to the roof portion 2 from being transmitted to the base portion 1. Also, the cavity 21 is helpful in giving the upper jaw portion 1b a movement independent of the lower jaw portion 1a and connecting portion 1c and is thus helpful in fitting the base portion 1 and the opening edge 92 each other.

The guide portion 3 is disposed in the roof portion 2 and is cylindrically extended in the axial direction (in FIG. 1, in the upward direction) from the inner end of the roof portion 2. The guide portion 3 plays a role to guide and hold the wire harness 7. For this reason, the inside diameter (approx. 15 mm φ) of the guide portion 3 is equivalent to the bundle diameter of the harness 7. The guide portion 3 has a length of the order of 40 mm.

On the upper surface of the roof portion 2 corresponding to the base of the guide portion 3, there is formed a U groove (having a depth of approx. 4 mm) in such a manner that it surrounds the guide portion 3. Provision of the U groove 22 makes it possible that only the guide portion 3 can be bent without deforming the roof portion 2 and base portion 1.

The stays 4 are so disposed as to cross one another through the axis of the grommet A (FIG. 2). The stays 4 are respectively formed in a triangular plate member (having a thickness of approx. 2 mm) and are used to connect the side wall of the guide portion 3 with the outer wall of the roof portion 2. That is, the stays are also used to reinforce the lowered mechanical strength of the grommet A due to formation of the U groove 22 when the grommet A is mounted to the opening edge 92 and when the grommet A is bent.

When the thus structured grommet A is fitted into the opening 91 formed in the mating member 9, at first, the wire harness 7 is inserted through the grommet A (FIG. 1). Then, while holding the upper end portion of the guide portion 3, the wire harness 7 and grommet A are pulled out from the car room side toward the engine room side. As a result of this, the opening edge 92 is slided along the inclined surface of the upper surface associated with the upper jaw portion 1b of the base portion 1 and is then fitted with the mounting groove 11.

In a case where the opening edge 92 is punched into a circular shape and the burring portion 93 is formed inclined with respect to the panel surface (FIG. 6), the fitting condition between the opening edge 92 and the mounting groove 11 is as shown in FIGS. 4 and 5.

In the portion where the burring portion 93 stands up at an acute angle with respect to the panel surface (FIG. 4), the inner end portion 94 of the mating member 9 can be contacted with the corner portion 17. Further, in fitting, because the mating member 9 is lapped with the sealing annular portions 13, 14 and annular projection 16, an external force is exerted on the lower jaw portion 1a from the mating member 9 in a direction of an arrow shown in FIG. 4. However, since the annular cavity 19 is provided, the annular cavity 19 is contracted to thereby be able to absorb such lapping.

Although the lower jaw portion 1a is turned about the annular cavity 19, such a turn produces a rubber elastic repulsive force which moves the lower jaw portion 1a back in the periphery of the annular cavity 19. As a result of this, the sealing annular portions 13 and 14 and annular projection 16 can keep a pressure contact condition with the mating member 9. The leading end of the burring portion 93 is abutted against the upper surface 18 of the mounting groove 11.

On the other hand, in the portion where the burring portion 93 stands up at an obtuse angle with respect to the panel surface (FIG. 5), while the inner end portion 94 of the mating member 9 is contacted with the corner portion 17, the leading end of the burring portion 93 pushes up a corner to be defined by the upper jaw portion 1b and connecting portion 1c. This push-up action applies an external force shown by a solid and black arrow in FIG. 5 to the grommet A, however, such an external force can be absorbed by the cavity 21.

Referring to the sealing annular portions 13, 14 and annular projection 16, since the base portion 1 is elastically deformed similarly to FIG. 4, the sealing annular portions 13, 14 and annular projection 16 are pressure contacted with the mating member 9.

Thus, even when the burring portion 93 is inclined with respect to the panel surface, provision of the cavity 21 and annular cavity 19 provides flexibility to the deformation of the mounting groove 11, which can make the grommet A fit the opening edge 92. In particular, as described above, since the grommet A according to the present embodiment includes five sealing points at which the grommet A can fit the mating member 9 in a pressure contact manner, there can be secured a perfect water preventive effect.

Also, the wire harness 7 is often bent extremely from the neighborhood of the exit of the grommet A. However, in this case as well, since there is formed the U groove 22, such bend can be accommodated sufficiently. That is, because bending stresses such as a bent applied to the guide portion 3 and the like can be absorbed by the cavity 21 and U groove 22, there is no possibility that an external force having an effect on the sealing property of the grommet A is transmitted to the base portion 1.

Further, the conventional grommet C has a high bending center because the thin cone portion 8 thereof is bent (FIG. 23). On the other hand, according to the present embodiment, since the U groove 22 is formed at a low position near the base portion 1, the bending center of the grommet A is lowered, which facilitates the operation of the grommet A even when the wire harness 7 is bent in an extreme manner. Further, the lowered mechanical strength of the grommet A due to formation of the U groove 22 raises no problem, as it is reinforced by the stays 4.

In addition, since the sealing annular portions 13 and 14 are disposed inwardly of the outside diameter of the base portion 1, water prevention can be achieved even if the flat portions required for the peripheral portions of the opening edge 92 of the mating member 9 are small.

(2) Embodiment 2

Figure 7:
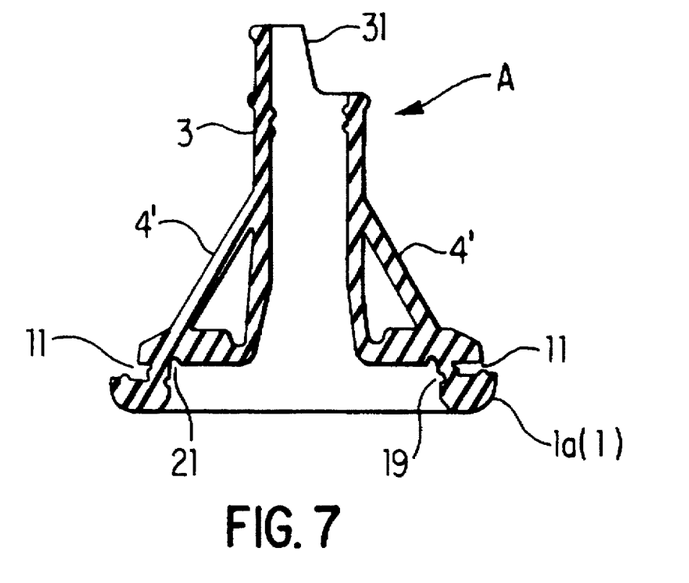
FIG. 7 is a longitudinal section view of a second embodiment of the grommet according to the invention.

In the second embodiment, instead of the plate-like stays 4 employed in the first embodiment, the grommet A uses a plurality of rod-like stays 4' (FIG. 7). This structure reduces the connecting area of the stays 4' and roof portion 2 and enhances the flexibility of the U groove 22 portion against bending, thereby making it easier to mount and bend the wire harness 7.

In the second embodiment, the guide portion 3 includes a projecting piece 31 which projects on and from the upper end of the guide portion 3. When the wire harness 7 is inserted through the grommet A, the wire harness 7 is firstly secured to the projecting piece 31 by use of a tape or the like and is then positioned to thereby prevent the wire harness 7 from shifting out of place. The remaining portions of the structure of the second embodiment are similar to those of the first embodiment.

(3) Embodiment 3

Figure 8:
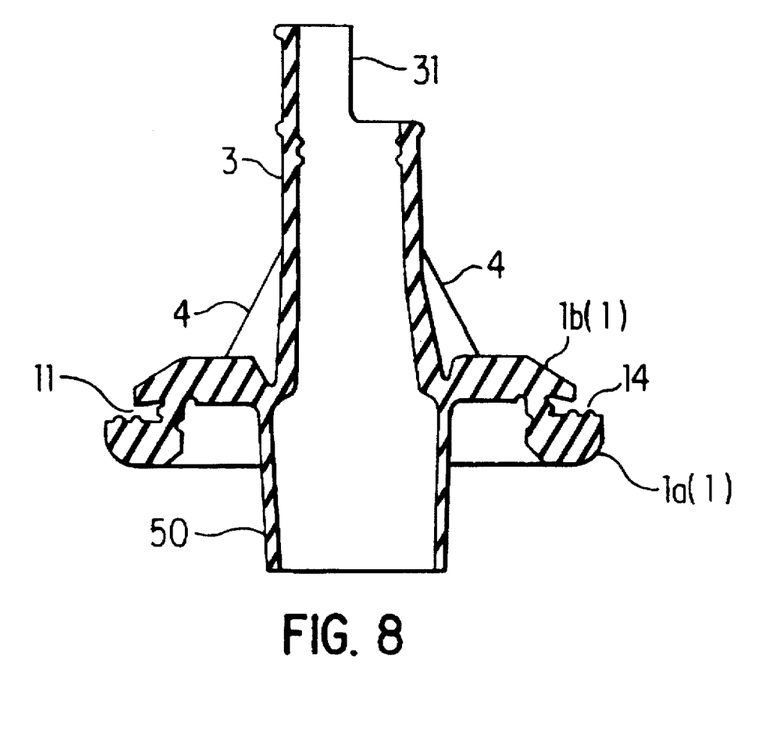
FIG. 8 is a longitudinal section view of a third embodiment of the grommet according to the invention.

In the third embodiment, in addition to the first embodiment, a guide portion 50 is further provided in the base portion 1 side as well (FIG. 8). Due to provision of the guide portion 50, the wire harness 7 can be protected in the corresponding portion thereof as well and thus the bundle condition of the wire harness 7 can be secured. In FIG. 8, the grommet A is formed symmetrically, except for the projecting piece 31.

It should be noted here that the present invention is not limited to the above-mentioned embodiments but various changes and modifications are possible within the scope of the invention according to objects and uses. For example, the sizes, shapes, materials and the like of the base portion 1, roof portion 2, guide portion 3, mounting groove 11, cavity 21, annular cavity 19, and U groove 22 can be changed according to uses. The roof portion 2 may be formed in an umbrella shape, while the bending center thereof is moved to an upper position. The annular cavity 19 is formed in the inner wall surface of the base portion 1 in connection with the connecting portion 1c or lower jaw portion 1a, that is, the annular cavity 19 may be formed in any position, provided it belongs to the above area. In the illustrated embodiments, the grommet A is used for the wire harness 7, however, the grommet A according to the invention can also be used to protect a tube, a hose, a cable and the like. Also, the grommet A according to the invention can be applied to a mating member having various openings as well.

(4) Embodiment 4

Figure 9:
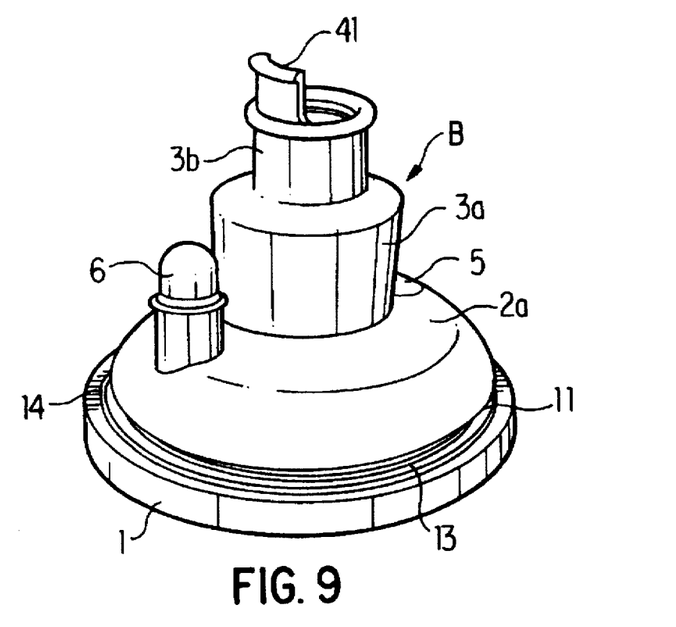
FIG. 9 is a perspective view of a fourth embodiment of a grommet according to the invention.
Figure 10:
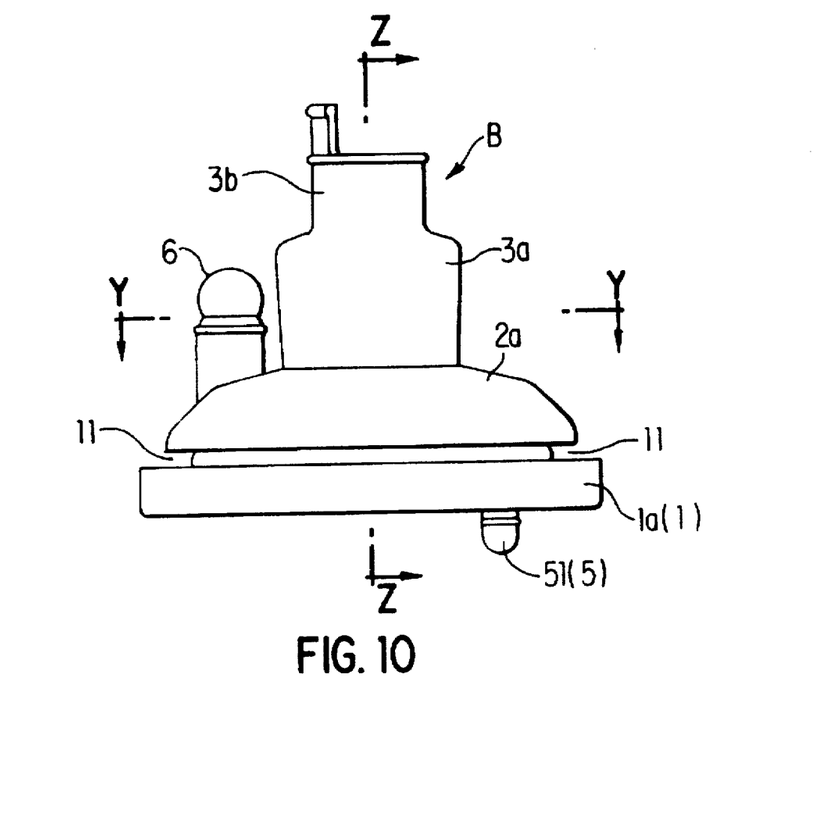
FIG. 10 is a front view of the grommet shown in FIG. 9.
Figure 11:
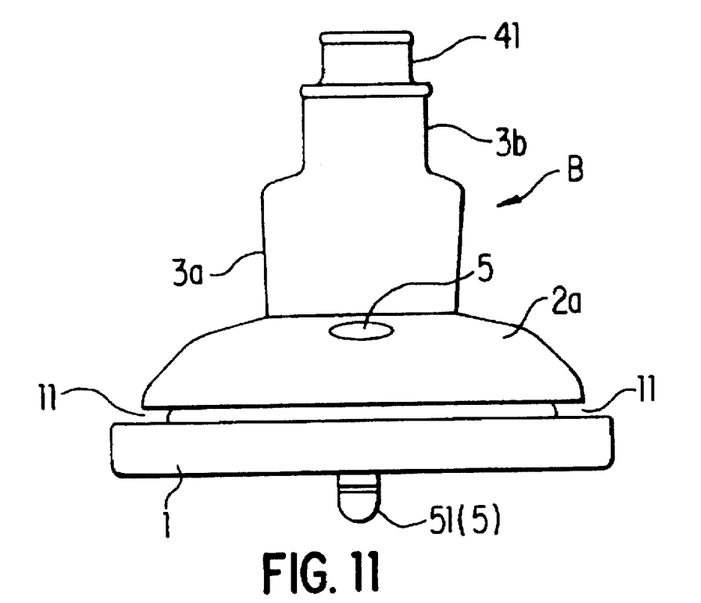
FIG. 11 is a side view of the grommet shown in FIG. 9.
Figure 12:
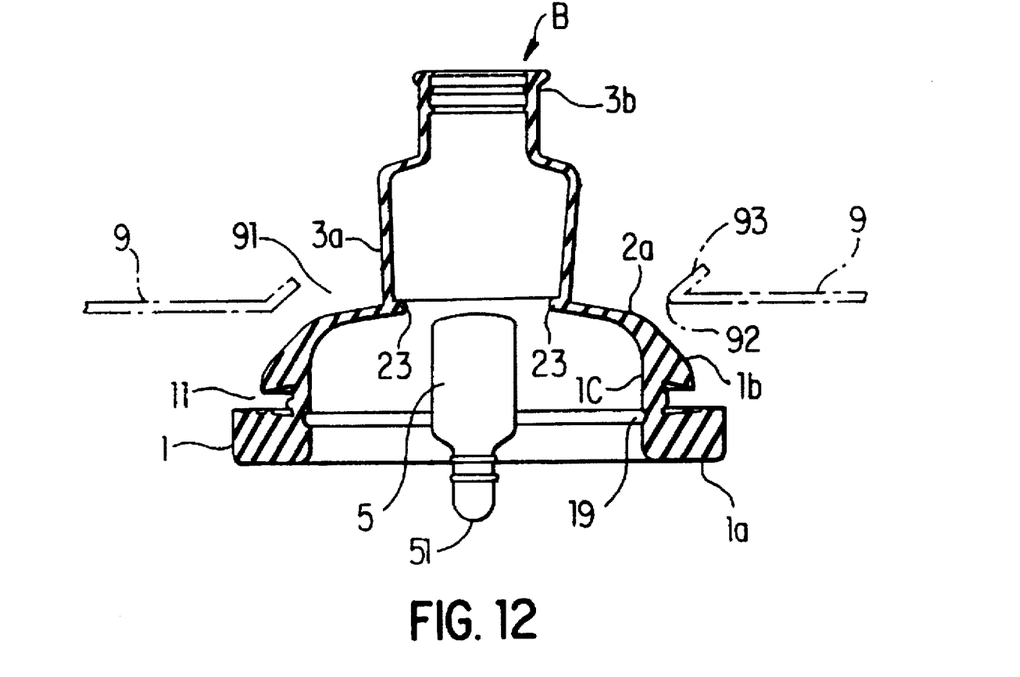
FIG. 12 is a section view taken along the line Z—Z shown in FIG. 10.
Figure 13:
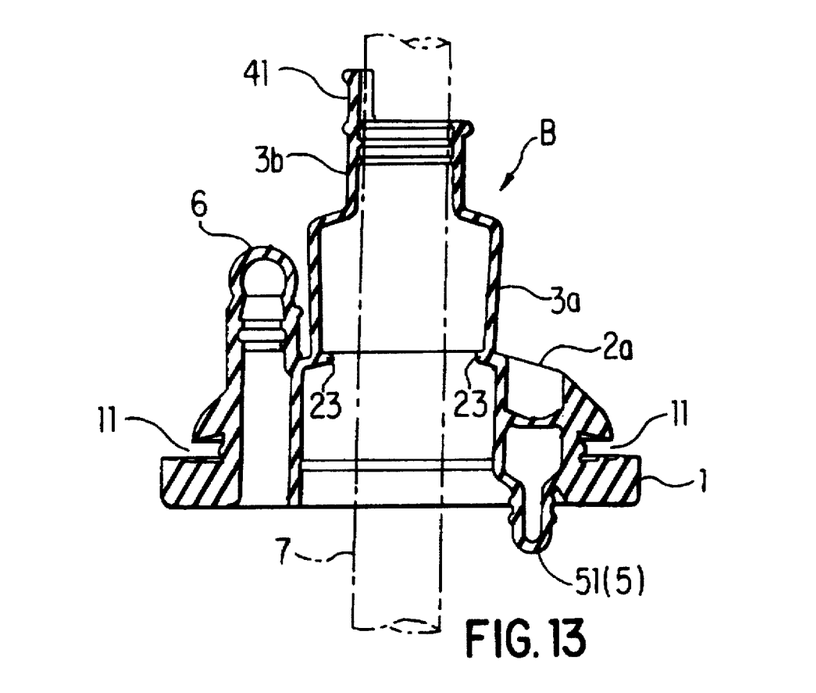
FIG. 13 is a longitudinal section view of the grommet, taken along the line X—X shown in FIG. 14.
Figure 14:
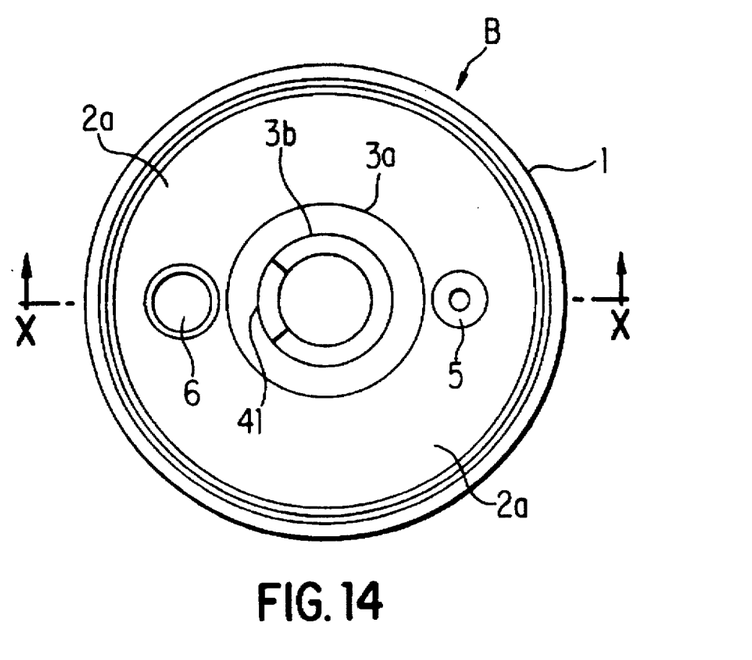
FIG. 14 is a plan view of the grommet.
Figure 15:
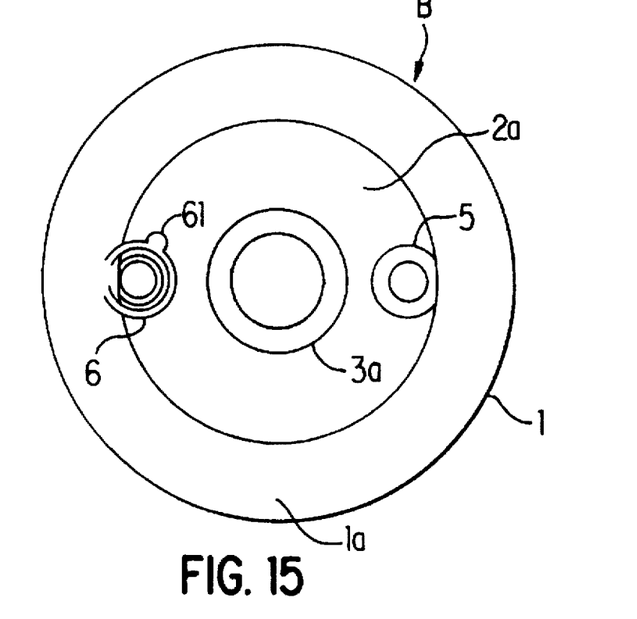
FIG. 15 is a bottom view of the grommet.
Figure 16:
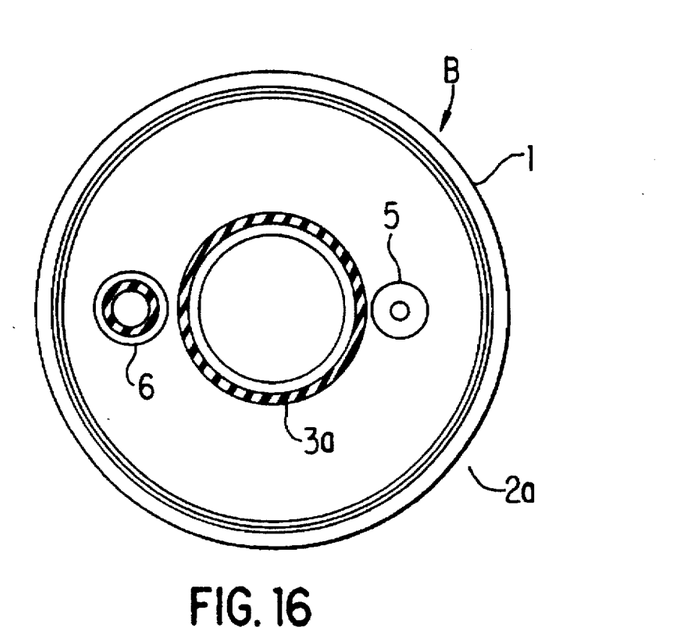
FIG. 16 is a section view taken along the line Y—Y shown in FIG. 10.
Figure 17:
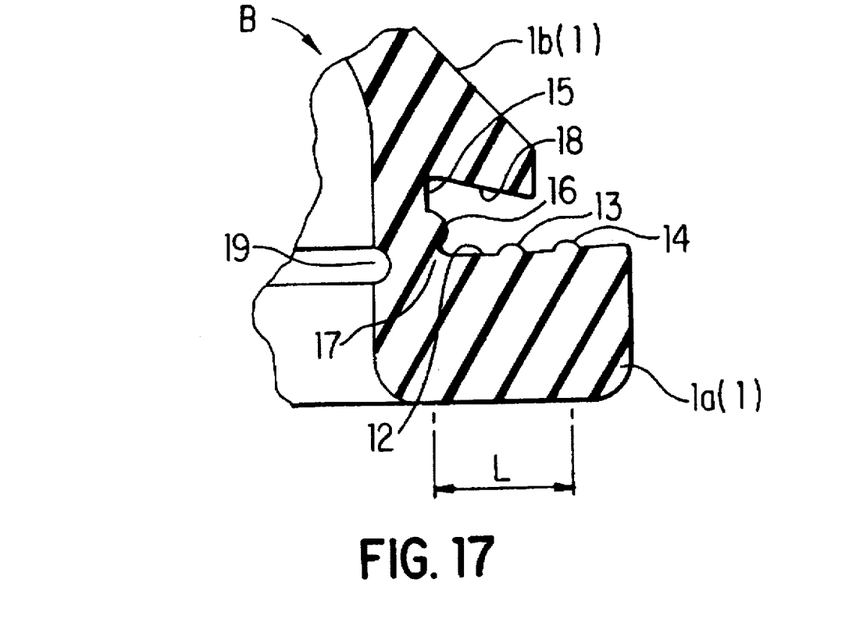
FIG. 17 is an enlarged view of the peripheral portions of a base portion of the grommet.
Figure 18:
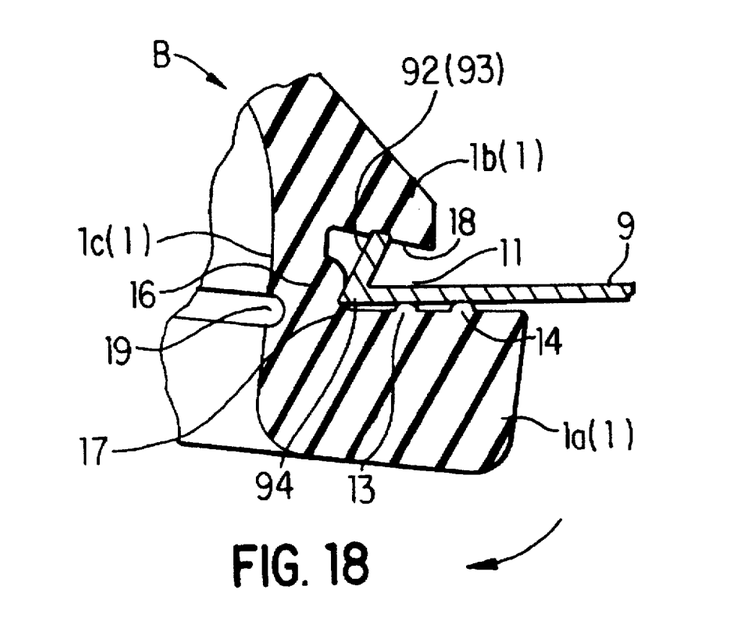
FIG. 18 is an enlarged view of the base portion, showing a state thereof in which it is in fit with a mating member.
Figure 19:
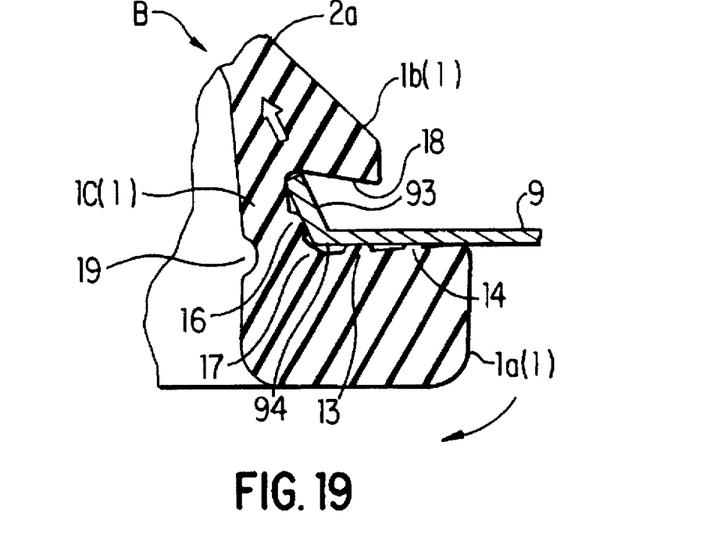
FIG. 19 is an enlarged view of the base portion, showing a state thereof in which it is in fit with a mating member.

Now, in FIGS. 9 to 19, there is shown the fourth embodiment of the grommet according to the invention. In particular, FIG. 9 is a perspective view of the grommet according to the fourth embodiment, FIG. 10 is a front view of the grommet, FIG. 11 is a side view of the grommet, FIG. 12 is a section view taken along the line Z—Z shown in FIG. 10, and FIG. 13 is a longitudinal section view of the grommet and corresponds to a section view taken along the line X—X shown in FIG. 14. FIG. 14 is a plan view of the grommet, FIG. 15 is a bottom view of the grommet, FIG. 16 is a section view taken along the line Y—Y shown in FIG. 10, FIG. 17 is an enlarged view of the peripheral portions of the base portion of the grommet, and FIGS. 18 and 19 are respectively enlarged views of the base portion, showing the fitting condition thereof with respect to a mating member. In the fourth embodiment, similar components to those employed in the first embodiment are given the same designations and thus the description thereof is omitted here.

Reference character 2a designates a roof portion which is extended inwardly from an opening end portion in connection with the upper jaw portion 1b of the base portion 1 having a large diameter (FIG. 10). The base portion 1 and roof portion 2a cooperate in forming a bowl-like body, so that the grommet B according to this embodiment is slided on the opening edge 92 of the mating member 9 to thereby be easily mounted on the opening 91. The boundary between the base portion 1 and roof portion 2a is not clear here. The roof portion 2a is formed thin, that is, the thickness of the roof portion 2a is of the order of 2 mm. The roof portion 2a has an incline, that is, the roof portion 2a expands gradually in an upward direction over the whole area thereof. Due to provision of this incline of the roof portion 2a, as will be described later, when a liquid hardening filler F is poured into a medium diameter portion 3a, the liquid surface of the filler F is smoothly lowered while the filler F is penetrating.

Figure 20:
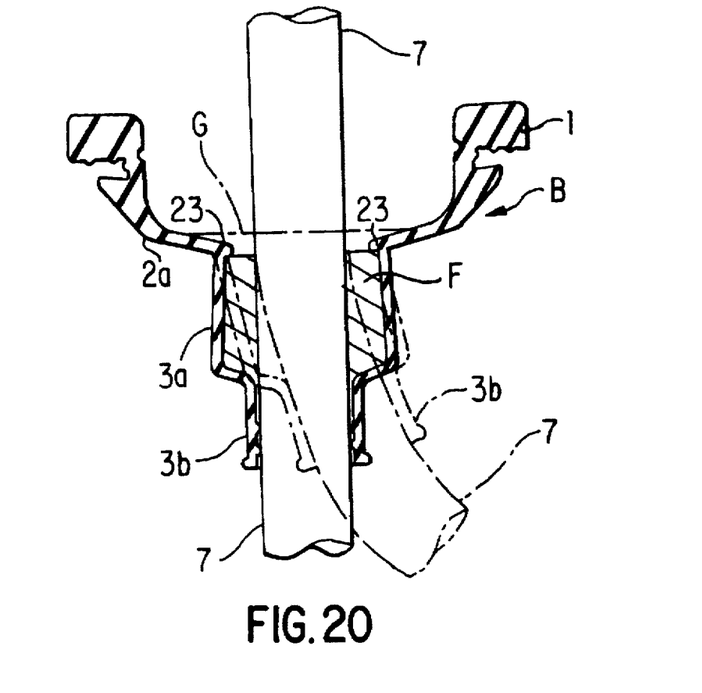
FIG. 20 is a longitudinal section view of the grommet into which a filler is loaded.

The medium diameter portion 3a is extended from the roof portion 2a upwardly in the axial direction (FIG. 11). The medium diameter portion 3a is formed in a cylindrical shape which is so arranged as to have an inside diameter larger than the bundle diameter of the wire harness 7 to be inserted through the grommet B. The present grommet B is devised so that it can be used in common in various types of cars, and also the liquid hardening filler F (which will be described later) can be loaded into the medium diameter portion 3a according to the car design specifications. The medium diameter portion 3a has a cylindrical diameter which is slightly increased in an invertedly tapered manner as it goes toward the top thereof (FIG. 20). When the filler F is poured into the medium diameter portion 3a, the invertedly tapered shape is helpful in preventing the filler F from falling down because the material of the grommet B, namely, ethylene propylene rubber has a poor adhesive strength.

In this embodiment, the medium diameter portion 3a has a cylindrical length of approx. 20 mm, and the inside diameter (approx. 30 mm $\phi$) of the upper end of the medium diameter portion 3a is made approx. 1–5 mm larger than the inside diameter of the lower end of the medium diameter portion 3a.

Also, the leading end of the roof portion 2a is extended to the connecting portion between the medium diameter portion 3a and the roof portion 2a to form an inwardly facing flange 23 which extends toward the center of the grommet B. The flange 23 and the medium diameter portion 3a formed in an invertedly tapered manner prevent the filler F hardened in the medium diameter portion 3a from falling down.

Reference character 3b designates a small diameter portion which is reduced continuously in diameter from the opening end of the medium diameter portion 3a and is extended further upwardly (FIG. 9). The small diameter portion 3b plays a role to guide and hold the wire harness 7 which is inserted through the grommet B. The small diameter portion 3b has an inside diameter which is approx. 15 mm $\phi$ and corresponds to the bundle diameter of the wire harness 7. Further, the length of the small diameter portion 3b is of the order of 40 mm.

Reference character 41 designates a projecting piece which is provided by projecting out part of the opening edge from the small diameter portion 3b. When the wire harness 7 is inserted through the grommet B, the wire harness 7 is at first secured to the projecting piece 41 by use of a tape or the like and is positioned to thereby prevent the same from shifting out of place.

Reference character 5 designates an insertion tube for a hood cable which is so provided as to extend along the inner wall of the base portion 1 from the roof portion 2a and face downwardly in the axial direction of the grommet. The insertion tube 5 is sealed in a leading end 51 thereof and the leading end is projected out beyond the bottom surface of the base portion 1. Further, reference character 6 designates a tube for a rear washer. The tube 6 extends along the inner wall of the base portion 1 and is projected from the roof portion 2a upwardly in the axial direction of the grommet. The tube 6 is also sealed in the leading end thereof. For cars to which the hood cable and rear washer are applied, the leading end portions of the insertion tube 5 and tube 6 should be cut off respectively and, for other cars, they are left as they are.

Reference character 61 designates a thick portion for gate of injection, which is provided on the outer wall of the tube 6.

When fitting the thus structured grommet B with the opening 91 formed in the mating member 9, the following procedures are taken, for example. At first, the wire harness 7 is inserted through the grommet B. Then, while holding the small diameter portion 3b side of the grommet B, the grommet B and wire harness 7 are pulled out together from the car room side toward the engine room side. As a result of this, the opening edge 92 is slided on the inclined surface of the upper surface associated with the upper jaw portion 1b of the base portion 1 and is then fitted with the mounting groove 11.

In a case where the opening edge 92 is punched out into a circular shape and a burring portion 93 so inclined as shown in FIG. 6 with respect to the panel surface is formed in the opening edge 92, the opening edge 92 and the grommet B are fitted with each other in such a condition as shown in FIGS. 18 and 19.

In particular, in the portion where the burring portion 93 stands up at an acute angle with respect to the panel surface (FIG. 18), the inner end portion 94 of the mating member 9 is contacted with the corner portion 17. Further, in fitting, since the mating member 9 is lapped with the sealing annular portions 13, 14 and annular projection 16, an external force is applied from the mating member 9 to the lower jaw portion 1a in a direction of an arrow shown in FIG. 18. However, since the annular cavity 19 is provided, the annular cavity 19 is contracted to thereby be able to absorb such an external force.

The lower jaw portion 1a is turned about the annular cavity 19 portion and this turn of the lower jaw portion is generates a rubber elastic repulsive force which moves the lower jaw portion 1a back in the periphery of the annular cavity 19. This allows the sealing annular portions 13, 14 and annular projection 16 to keep a pressure contact condition with the mating member 9, thereby being able to enhance the water preventive effect of the grommet. Further, the leading end of the burring portion 93 is contacted with the upper surface 18 of the mounting groove 11.

On the other hand, in the portion where the burring portion 93 stands up at an obtuse angle with respect to the panel surface (FIG. 19), the inner end portion 94 of the mating member 9 is contacted with the corner portion 17 and, further, the leading end of the burring portion 93 pushes up against the corner portion that is defined by the upper jaw portion 1b and connecting portion 1c. This push-up action applies an external force shows by a solid and black arrow in FIG. 19 to the grommet B, but such an external force can be absorbed not only by the turning deformation of the lower jaw portion 1a but also by the expansive deformation of the peripheral portions of the annular cavity 19.

Referring to the sealing annular portions 13, 14 and annular projection 16, since the base portion 1 is elastically deformed similarly to FIG. 18, the sealing annular portions 13 and 14 and annular projection 16 can be pressure contacted with the mating member 9.

Because the sealing annular portions 13, 14 are disposed inwardly of the outside diameter portion of the base portion 1, a water preventive function can be performed even if the flat portions thereof required for the peripheral portions of the opening edge 92 of the mating member 9 are small.

As described above, even if the burring portion 93 is inclined with respect to the panel surface, provision of the annular cavity 19 renders flexibility to the deformation of the mounting groove 11 and, further, provision of the sealing annular portions 13, 14 and annular projection 16 allows the grommet B to fit the opening edge 92 well. Especially, in the grommet B according to the present embodiment, as described above, there are provided five sealing points at which the grommet B fits the mating member 9 in a pressure contact manner, thereby being able to secure substantially perfect water prevention. That is, this prevents water from getting into the car room. Further, the grommet according to the present embodiment does not have to be pressure contacted with or abutted against the mating member 9 at all the above-mentioned sealing points.

In addition to the fact that the grommet B can fit the opening edge 92 of the mating member 9 and thus can perform the water preventive function, the grommet B also can effectively adapt itself to a case in which a filler is loaded into the grommet in order to prevent water from entering from between the electric wires that form the wire harness 7.

For this purpose, there is generally employed a liquid hardening filler in which it is liquid when it is poured and it is hardened with the passage of time. When pouring the filler F, at first, the wire harness 7 is inserted through the grommet B and, after that, as shown in FIG. 20, while the base portion 1 is turned to face upwardly, the filler F is poured into the medium diameter portion 3a. Since the roof portion 2a is inclined as described above, the filler F is gradually hardened while penetrating into gaps between the electric wires, while the liquid surface of the filler F is lowered from its initial position G, and the filler F is finally stored into the medium diameter portion 3a. Since the inwardly facing flange 23 serves as a stopper against the hardened filler F, the filler F will never be removed even if the filler F has a weak contact force with respect to the grommet B. Also, because the medium diameter portion 3a has a diameter which increases toward the small diameter portion 3b, the filler F stored in the medium diameter portion 3a cannot be easily removed toward the roof portion 2a side as well as the small diameter portion 3b side. That is, the filler F is held surely in the grommet B to obtain a high water preventive effect.

On the other hand, if the filler F is loaded into the grommet B, then the water preventive function within the grommet B can be enhanced, whereas the portion of the grommet (namely, the medium diameter portion 3a) in which the filler F is loaded is stiffened. Therefore, according to the conventional grommet, when the wire harness 7 must be bent and provided, the clearances S and M between the opening edge 92 and base portion 1 are widened, lowering the sealing property of the grommet B. However, according to the grommet B of the present embodiment, even if the medium diameter portion 3a is stiffened, the roof portion 2a and small diameter portion 3b are so deformable as to be able to absorb the bent wire harness 7, so that the base portion 1 is prevented from being deformed. That is, the water preventive function of the base portion 1 can never be deteriorated (see two-dotted chain lines in FIG. 20).

If a bending external force is applied, according to the conventional grommet, the whole grommet is bent and the bending center thereof is high (FIG. 23). On the other hand, in the grommet B according to the present embodiment, since the grommet B is bent in the neighborhood of the base of the medium diameter portion 3a, the bending center thereof is lowered and thus the grommet B is easy to adapt itself to the extremely bent provision of the wire harness 7. Even when the filler F is not loaded into the grommet B, the medium diameter portion 3a is formed cylindrically in an invertedly tapered manner and the grommet B is easily bent in the neighborhood of the base of the medium diameter portion 3a to thereby be able to lower the bending center.

Also, since the insertion tube 5 is so formed as to project out beyond the bottom surface of the base portion 1, the leading end of the insertion tube 5 may be cut off for a car incorporating a hood cable therein, to stabilize the seating of the grommet B. Therefore, those skilled in the art can easily find the difference between a grommet having the insertion tube 5 whose leading end has been cut off and another grommet having the insertion tube 5 whose leading end is remained. This makes it possible to find out a careless mistake which would be made in the assembling operation of the grommet B and wire harness 7. Further, since the insertion tube 5 is projected out, it is also easy to set the grommet in a jig.

The grommet B is able to adapt itself to the above-mentioned various cases, can be applied to various types of cars as common parts, and is helpful in inventory and cost reduction.

It should be noted here that the invention is not limited to the above-mentioned embodiments but various changes are possible without departing from the scope of the invention according to objects and uses. For example, the sizes, shapes, materials and the like of the base portion 1, roof portion 2a, medium diameter portion 3a, small diameter portion 3b, mounting groove 11, annular cavity 19, and inwardly facing flange 23 can be changed according to uses.

As has been described heretofore, in the grommet according to the invention, even if the burring portion provided in the periphery of the opening is inclined, or even if the wire harness is bent, the base portion of the grommet can keep a fitting condition with the mating member to thereby perform the water preventive function. Also, by loading the filler into the medium diameter portion of the grommet while maintaining the water preventive function thereof, the grommet can prevent water from entering from gaps between the electric wires that form the wire harness. That is, the grommet can provide the excellent water preventive effect.

What is claimed is:

1. A grommet comprising:
    a base portion having in an annular outer peripheral wall thereof a mounting groove fittable with an opening edge of a mating member;
    a roof portion extending inwardly from an opening end of said base portion; and
    a guide portion extending in a cylindrical shape in an axial direction of said grommet from an inner end of said roof portion,
    wherein a first annular cavity is formed in an inner wall of said grommet extending from said base portion to said roof portion and being indented in a direction of the roof portion, and a second annular cavity is formed in an inner peripheral wall of said base portion corresponding to a position of the mounting groove.

2. The grommet as set forth in claim 1, wherein a U groove for surrounding said guide portion is formed at a position of said roof portion corresponding to a base of said guide portion.

3. The grommet as set forth in claim 2, further comprising a plurality of stays for connecting a side wall of said guide portion with an outer wall of said roof portion.

4. The grommet as set forth in claim 3, wherein said stays are plate-like stays.

5. The grommet as set forth in claim 3, wherein said stays are rod-like stays.

6. The grommet as set forth in claim 1, wherein the mounting groove is so recessed as to have a U-shaped section, and a sealing annular portion is raised and formed on a lower surface of said mounting groove and at a position inside an outside diameter portion of said base portion.

7. The grommet as set forth in claim 1, wherein the first annular cavity faces in an axial direction of said grommet away from the guide portion.

8. The grommet as set forth in claim 1, wherein the roof portion is substantially thicker than the guide portion.

9. The grommet as set forth in claim 1, wherein the first annular cavity and the second annular cavity are indented into the grommet in substantially perpendicular directions with respect to each other.

10. A grommet comprising:
    a base portion having in an annular outer peripheral wall thereof a mounting groove fittable with an opening edge of a mating member;
    a roof portion extending inwardly from an opening end of said base portion; and
    a guide portion extending in a cylindrical shape in an axial direction of said grommet from an inner end of said roof portion,
    wherein a first annular cavity is formed in an inner wall of said grommet extending from said base portion to said roof portion and being indented in the direction of the roof portion, wherein a second annular cavity is formed in an inner peripheral wall of said base portion corresponding to a position of the mounting groove, and wherein a U groove for surrounding said guide portion is formed in said roof portion.

11. The grommet as set forth in claim 10, wherein the first annular cavity and the second annular cavity are indented into the grommet in substantially perpendicular directions with respect to each other.

* * * * *